(12) United States Patent
Liu et al.

(10) Patent No.: US 10,701,146 B2
(45) Date of Patent: Jun. 30, 2020

(54) METHOD, APPARATUS, AND SYSTEM FOR DEEP MIRRORING

(71) Applicant: HUAWEI TECHNOLOGIES CO., LTD., Shenzhen, Guangdong (CN)

(72) Inventors: Maozheng Liu, Shenzhen (CN); Heng Liao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 368 days.

(21) Appl. No.: 15/499,145

(22) Filed: Apr. 27, 2017

(65) Prior Publication Data
US 2017/0230456 A1    Aug. 10, 2017

Related U.S. Application Data

(63) Continuation of application No. PCT/CN2015/091938, filed on Oct. 14, 2015.

(30) Foreign Application Priority Data

Oct. 28, 2014 (CN) .......................... 2014 1 0592728

(51) Int. Cl.
*H04L 29/08* (2006.01)
*G06F 11/20* (2006.01)
*G06F 11/14* (2006.01)

(52) U.S. Cl.
CPC .......... *H04L 67/1095* (2013.01); *G06F 11/14* (2013.01); *G06F 11/1464* (2013.01);
(Continued)

(58) Field of Classification Search
None
See application file for complete search history.

(56) References Cited

U.S. PATENT DOCUMENTS

2005/0273650 A1   12/2005  Tsou
2006/0015946 A1    1/2006  Yagawa
(Continued)

FOREIGN PATENT DOCUMENTS

CN          1627326 A    6/2005
CN        101814088 A    8/2010
(Continued)

OTHER PUBLICATIONS

International Search Report dated Jan. 21, 2016 in corresponding International Application No. PCT/CN2015/091938.
(Continued)

*Primary Examiner* — Davoud A Zand
(74) *Attorney, Agent, or Firm* — Conley Rose, P.C.

(57) ABSTRACT

A method, an apparatus, and a system for deep mirroring are disclosed. The method includes: obtaining file data, an application program, and operating system information that are of a first device (S101); storing the file data, the application program, and the operating system information in a memory cell (S103): if an operation change occurs on the first device, receiving an operation change instruction or operation change data of the first device (S105); and updating the stored file data, application program, and operating system information according to the operation change instruction or the operation change data of the first device (S107). By using the solutions provided, depth and real-time performance in object mirroring are enhanced.

15 Claims, 10 Drawing Sheets

(52) U.S. Cl.
CPC ...... *G06F 11/2056* (2013.01); *G06F 11/2094* (2013.01); *H04L 67/1097* (2013.01); *H04L 67/34* (2013.01)

(56) References Cited

U.S. PATENT DOCUMENTS

2009/0307284 A1* 12/2009 Welingkar .......... G06F 11/1451
2013/0262615 A1* 10/2013 Ankireddypalle ...... G06F 3/067
709/213
2016/0116911 A1* 4/2016 Yamamoto .......... G06F 16/9024
700/98

FOREIGN PATENT DOCUMENTS

| CN | 102193842 A | 9/2011 |
|----|-------------|--------|
| WO | WO 2009/029803 A1 | 3/2009 |
| WO | WO 2009/055647 A1 | 4/2009 |

OTHER PUBLICATIONS

Extended European Search Report dated Sep. 11, 2017 in corresponding European Patent Application No. 15854019.5.
International Search Report dated Jan. 21, 2016 in corresponding to International Application PCT/CN2015/091938.
Chinese Office Action dated Jan. 22, 2018 in corresponding Chinese Patent Application No. 201410592728.8, 9 pp.

* cited by examiner

METHOD, APPARATUS, AND SYSTEM FOR DEEP MIRRORING

CROSS-REFERENCE TO RELATED APPLICATION

This application is a continuation of International Application No. PCT/CN2015/091938, filed on Oct. 14, 2015, which claims priority to Chinese Patent Application No. 201410592728.8, filed on Oct. 28, 2014. The disclosures of the aforementioned applications are hereby incorporated by reference in their entireties.

TECHNICAL FIELD

The present disclosure relates to the computer field, and provides a method, an apparatus, and a system for deep mirroring.

BACKGROUND

With development of digital technologies, and with further development of smartphones and abundant accessories thereof, wearable devices, and the smart hardware industry, every individual and every family are possessing more digital devices. In addition, with development of Internet of Things technologies, mass devices that were not networked before are being networked gradually. In face with mass devices, people are faced with great management and data backup challenges.

Current data backup technologies are implemented by using a cloud synchronization technology. Content that can be synchronized by using the cloud technology includes music, videos, television programs, Apps, purchase histories of books, photos and videos in a "camera film", App data, a home screen and App arrangement, iMessage, Short Message Service (SMS) and Multimedia Messaging Service (MMS) information, and ringtones. A synchronization technology that can be implemented at present backs up limited data content due to restrictions on synchronization bandwidth and synchronization data formats.

SUMMARY

Embodiments of the present invention provide a method, an apparatus, and a system for deep mirroring, so as to enhance depth and real-time performance in object mirroring.

According to a first aspect, an embodiment of the present invention provides a method for deep mirroring, where the method includes: obtaining file data, an application program, and operating system information that are of a first device; storing the file data, the application program, and the operating system information in a memory cell; if an operation change occurs on the first device, receiving an operation change instruction or operation change data of the first device; and updating the stored file data, application program, and operating system information according to the operation change instruction or the operation change data of the first device.

In a first implementation manner of the first aspect, before the storing the file data, the application program, and the operating system information in a memory cell, the method includes: obtaining account information of the first device; and the storing the file data, the application program, and the operating system information in a memory cell further includes: storing information about a first account of the first device.

In a implementation manner of the first aspect, the method further includes: if an instruction for pre-configuring, on a third device, information corresponding to the information about the first account is received, sending the operating system information, the application program, and the file data that are corresponding to the information about the first account to the third device.

In an implementation manner of the first aspect, the method includes: obtaining hardware model information of the first device; and storing the hardware model information of the first device, and binding the hardware model information of the first device to the first account; and if an instruction for purchasing a device corresponding to the first account is received, sending the operating system information, the application program, and the file data that are corresponding to the first account to a fourth device that matches the stored hardware model information.

In an implementation manner of the first aspect, the method further includes: obtaining 3D outer shape and inner structure diagrams of the first device; and storing the 3D outer shape and inner structure diagrams of the first device, and binding the 3D outer shape and inner structure diagrams of the first device to the first account; and if an instruction for presenting a device corresponding to the first account is received, presenting the 3D outer shape and inner structure diagrams of the first device.

In an implementation manner of the first aspect, after the updating the stored file data, application program, and operating system information according to the operation change instruction or the operation change data of the first device, the method further includes: recording an update occurrence time, and backing up the updated file data, application program, and operating system information.

In a implementation manner of the first aspect, verifying a request for login to the first account; receiving a request for obtaining location information of the first device corresponding to the first account; and obtaining the location information of the first device corresponding to the first account.

In an implementation manner of the first aspect, after the storing the file data, the application program, and the operating system information in a memory cell, the method further includes: calling, by using a processor, an instruction and code that are in the memory cell, and running the operating system and the application program that are obtained from the first device.

In an implementation manner of the first aspect, the obtaining file data, an application program, and operating system information that are of a first device includes: receiving the file data, the application program, and the operating system information that are sent by the first device; or receiving network link or version name information that is sent by the first device and that is of the file data, the application program, and the operating system, and obtaining the file data, the application program, and the operating system information according to the network link or the version name information.

According to a second aspect, an embodiment of the present invention provides a method for deep mirroring, where the method includes: sending file data, an application program, and operating system information to a second device; and if an operation change occurs, sending an operation change instruction or operation change data to the second device, so that the second device updates the file data, the application program, and the operating system information.

In a first implementation manner of the second aspect, the method further includes: sending information about a first account and corresponding to the file data, the application program, and the operating system information to the second device, so that the second device stores the information about the first account and corresponding to the file data, the application program, and the operating system information.

In an implementation manner of the second aspect, the method further includes: sending 3D outer shape and inner structure diagrams corresponding to the information about the first account to the second device, so that the second device stores the 3D outer shape and inner structure diagrams corresponding to the information about the first account.

With reference to the second aspect, the method further includes: receiving a request for obtaining location information of a first device corresponding to the first account, and sending the location information of the first device to the second device.

According to a third aspect, an embodiment of the present invention provides an apparatus for deep mirroring, where the apparatus includes: an information obtaining module, a storage module, and an update module, where the information obtaining module is configured to obtain file data, an application program, and operating system information that are of a first device; the storage module is configured to store the file data, the application program, and the operating system information in a memory cell, where if an operation change occurs on the first device, the information obtaining module is further configured to receive an operation change instruction or operation change data of the first device; and the update module is configured to update the stored file data, application program, and operating system information according to the operation change instruction or the operation change data of the first device.

In a first implementation manner of the third aspect, before the storing the file data, the application program, and the operating system information in a memory cell, the information obtaining module is further configured to obtain account information of the first device; and the storage module is further configured to store information about a first account of the first device; and the apparatus further includes a sending module, where if an instruction for pre-configuring, on a third device, information corresponding to the information about the first account is received, the sending module is configured to send the operating system information, the application program, and the file data that are corresponding to the information about the first account to the third device.

With reference to the third aspect, the information obtaining module is specifically configured to receive the file data, the application program, and the operating system information that are sent by the first device; or the information obtaining module is specifically configured to receive network link or version name information that is sent by the first device and that is of the file data, the application program, and the operating system, and obtaining the file data, the application program, and the operating system information according to the network link or the version name information.

With reference to the third aspect, in an implementation manner of the third aspect, the information obtaining module is further configured to obtain hardware model information of the first device; the storage module is further configured to store the hardware model information of the first device; and the apparatus further includes the sending module, where if an instruction for purchasing a device corresponding to the first account is received, the sending module is further configured to send the operating system information, the application program, and the file data that are corresponding to the first account to a fourth device that matches the stored hardware model.

With reference to the third aspect, the information obtaining module is further configured to obtain 3D outer shape and inner structure diagrams of the first device; the storage module stores the 3D outer shape and inner structure diagrams of the first device, and binds the 3D outer shape and inner structure diagrams of the first device to the first account: and if an instruction for presenting a device corresponding to the first account is received, the running module is configured to present the 3D outer shape and inner structure diagrams of the first device.

With reference to the third aspect, after the update module updates the stored file data, application program, and operating system information according to the operation change instruction or the operation change data of the first device, the storage module is further configured to record an update occurrence time, and back up the updated file data, application program, and operating system information.

With reference to the third aspect, the information obtaining module is further configured to: if a request for login to the first account is verified and a request for obtaining location information of the first device corresponding to the first account is received, obtain the location information of the first device corresponding to the first account.

With reference to the third aspect, in an implementation manner of the third aspect, the apparatus further includes the running module, and after the storing the file data, the application program, and the operating system information in a memory cell, the running module is configured to call, by using a processor, an instruction and code that are in the memory cell, and run the operating system and the application program that are obtained from the first device.

According to a fourth aspect, an embodiment of the present invention provides an apparatus for deep mirroring, where the apparatus includes: a first sending module and a second sending module, where the first sending module is configured to send file data, an application program, and operating system information to a second device. If an operation change occurs, the second sending module sends an operation change instruction or operation change data to the second device, so that the second device updates the file data, the application program, and the operating system information.

In a first implementation manner of the fourth aspect, the first sending module is further configured to send information about a first account and corresponding to the file data, the application program, and the operating system information to the second device, so that the second device stores the information about the first account and corresponding to the file data, the application program, and the operating system information.

In an implementation manner of the fourth aspect, the first sending module is further configured to send 3D outer shape and inner structure diagrams corresponding to the information about the first account to the second device, so that the second device stores the 3D outer shape and inner structure diagrams corresponding to the information about the first account.

In an implementation manner of the fourth aspect, the apparatus further includes a third sending module, where if a request for obtaining location information of a first device corresponding to the first account is received, the third sending module is configured to send the location information of the first device to the second device.

According to a fifth aspect, an embodiment of the present invention provides a method for deep mirroring, where the method includes: obtaining outer shape and structure information of a physical object; building a virtual object according to the outer shape and structure information of the physical object; and if the outer shape or structure information of the physical object changes, updating outer shape or structure information of the virtual object accordingly.

According to a sixth aspect, an embodiment of the present invention provides an apparatus for deep mirroring, where the apparatus includes: a physical object information obtaining module, a virtual object building module, and a virtual object update module, where the physical object information obtaining module is configured to obtain outer shape and structure information of a physical object; the virtual object building module is configured to build a virtual object according to the outer shape and structure information of the physical object; and if the outer shape or structure information of the physical object changes, the virtual object adjustment module is configured to update outer shape or structure information of the virtual object accordingly.

In the embodiments of the present invention, file data, an application program, and operating system information that are of a first device are obtained, and the file data, the application program, and the operating system information are stored in a memory cell. Therefore, not only file data can be backed up, but a wider range of objects such as operating system information can also be backed up. If an operation change occurs on the first device, an operation change instruction or operation change data of the first device is received and the stored file data, application program, and operating system information are updated according to the operation change instruction or the operation change data of the first device. In this way, the file data, the application program, and the operating system can be updated in real time.

DESCRIPTION OF EMBODIMENTS

Figure 1:
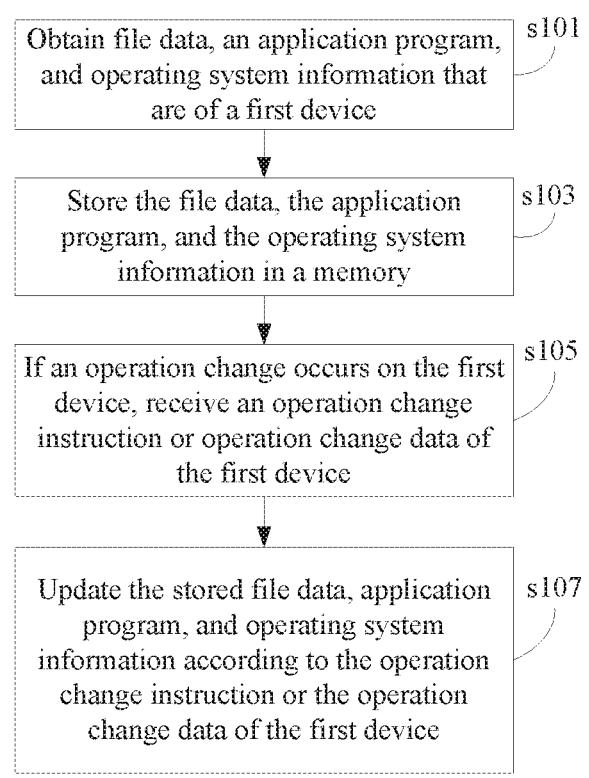
FIG. 1 is an accompanying drawing of an embodiment of a method for deep mirroring according to the present invention.

The embodiments of the present invention provide a method for deep mirroring. As shown in FIG. 1, FIG. 1 provides a flowchart of an embodiment of the method for deep mirroring of the present invention. The method includes: S101, obtaining file data, an application program, and operating system information that are of a first device; S103, storing the file data, the application program, and the operating system information in a memory cell; S105, if an operation change occurs on the first device, receiving an operation change instruction or operation change data of the first device; and S107, updating the stored file data, application program, and operating system information according to the operation change instruction or the operation change data of the first device.

In an embodiment of the present invention, the method is executed by a mirror device, and the first device is a mobile phone, a tablet computer, a camera, or the like. If the operation change occurring on the first device is that the first device executes a shooting action, the operation change data of the first device, such as a photo taken, is received. Updating the stored file data according to the operation change data of the first device means uploading the received photo to the mirror device synchronously. Changes on the first device are monitored in real time on a mirror client that operates on a physical device. Once a user operation is detected, an operation result is updated to the mirror device synchronously by using a synchronization protocol.

Figure 2:
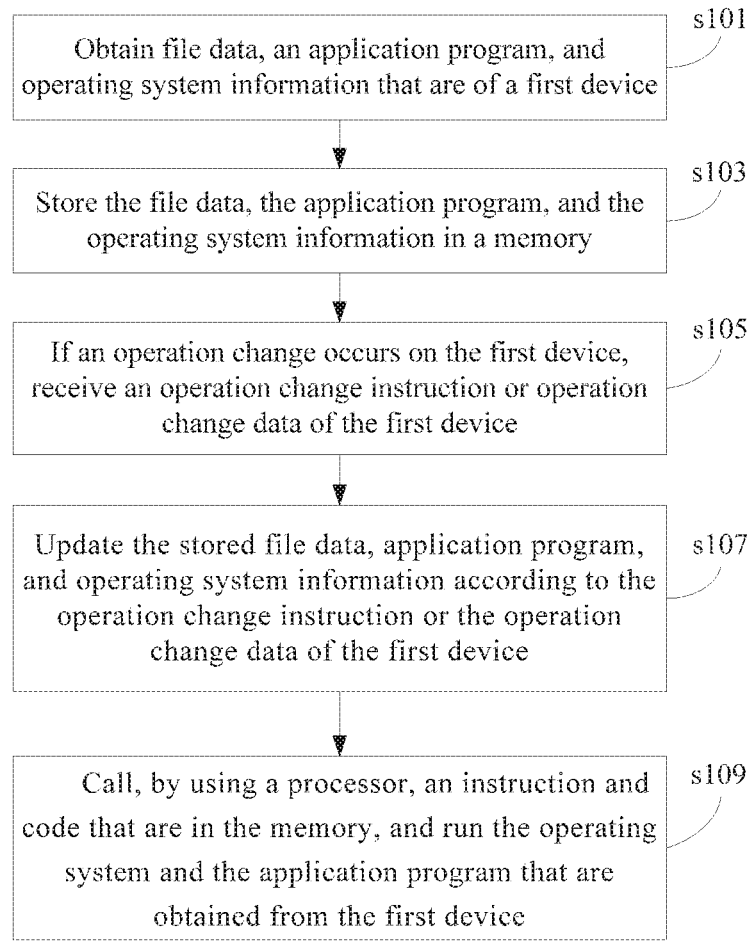
FIG. 2 is a flowchart of another embodiment of a method for deep mirroring according to the present invention.

In an embodiment of the present invention, as shown in FIG. 2, FIG. 2 provides a flowchart of another embodiment of the method for deep mirroring of the present invention. After the storing the file data, the application program, and the operating system information in a memory cell, the method further includes: S109, calling, by using a processor, an instruction and code that are in the memory cell to run the operating system and the application program that are obtained from the first device.

In an embodiment of the present invention, the method is executed by a mirror device, and the first device is a mobile phone, a tablet computer, a camera, or the like. After obtaining the file data, the application program, and the operating system information that are of the first device, the mirror device can run the operating system and the application program that are obtained from the first device. If an operation change occurs on the mirror device, the first device receives an operation change instruction or operation change data of the mirror device. Functions of the first device and the mirror device are interchangeable, each being a mirror device for the other.

In an embodiment of the present invention, the method is executed by a terminal device, such as a mobile phone or a tablet computer, and the first device is a mirror device for the terminal device. The mirror device is accessed by using a computer. The first device has a larger screen and more convenient interactive devices such as a keyboard and a mouse. Using the first device brings ease of operation, and an operation on and data of the first device can be updated to a mobile phone or a tablet computer synchronously. Further, when a user operates a desktop computer, activities of the user are mainly carried out on the computer. At this time, attention of the user is distracted if a mobile phone is also used. In this case, the user may operate a mirror device on the computer, as if an actual physical device is being operated. For example, the user starts, on the computer, a mirror device corresponding to the mobile phone, and starts an application program, such as WeChat, on the mirror device. At this time, the application program on the mirror device may be considered as a mirror application program for an application program on the physical device. The WeChat on the mirror can also be used to send a message, communicate with a friend, reply to a friend, and so on. The application program on the mirror device is run by a mirror simulator. A user operation is synchronized to the physical device by using a synchronization protocol, and then a mirror client on the physical device operates an actual application program. In this way, an off-machine operation is implemented.

Figure 3:
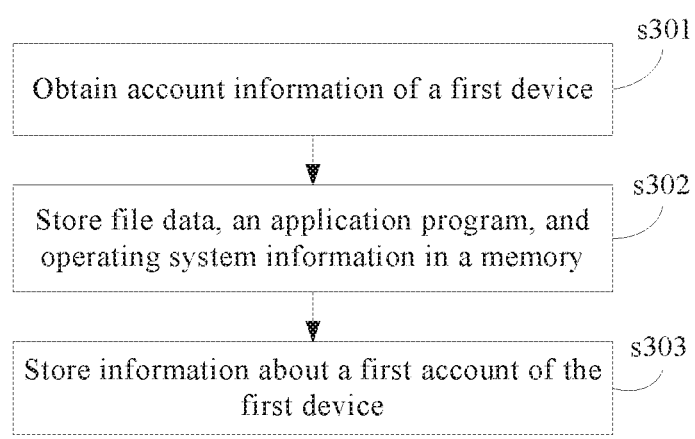
FIG. 3 is a flowchart of an embodiment of an account-involved method for deep mirroring according to the present invention.

In an embodiment of the present invention, before the storing the file data, the application program, and the operating system information in a memory cell, the method further includes: S301, obtaining account information of the first device; and before, after, or at the same time as the step S302 of storing the file data, the application program, and the operating system information in a memory cell, the method further includes: S303, storing information about a first account of the first device. As shown in FIG. 3, FIG. 3 provides a flowchart of an embodiment of an account-involved method for deep mirroring of the present invention. In the flowchart, S302 is before S303. However, ordering is not limited to what is illustrated in the drawing.

Figure 4:
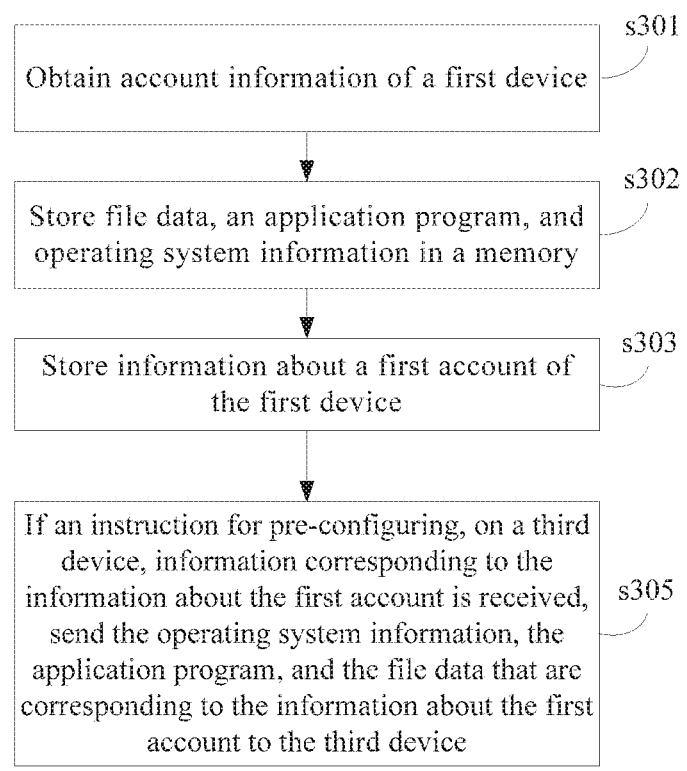
FIG. 4 is a flowchart of another embodiment of an account-involved method for deep mirroring according to the present invention.

In an embodiment of the present invention, as shown in FIG. 4, FIG. 4 provides a flowchart of another embodiment of the account-involved method for deep mirroring of the present invention. The method further includes: S305, if an instruction for pre-configuring, on a third device, information corresponding to the information about the first account is received, sending the operating system information, the application program, and the file data that are corresponding to the information about the first account to the third device.

If the first device is lost, the first device can be locked and some important data can even be destroyed by logging into the first account on the mirror device. Thereby, protection for a user can be achieved.

In this embodiment of the present invention, the first device is a mobile terminal device, an execution body is a cloud server for mobile terminal device mirroring, and the third device is another mobile terminal device. A mirror client is installed on the third device. The mirror client sends a request for information corresponding to the information about the first account to the cloud mirroring server. An instruction that is pre-configured on the third device is authenticated by the mirroring management platform, finds corresponding stored image information, and downloads the image information to the third device. In this way, all image information is restored on the third device, and the third device is exactly the same as the original information corresponding first device. Thereby, information migration and system restoration can be implemented. An effect achieved by this embodiment of the present invention is: when a physical device is replaced or lost, data and programs can be migrated to another device from a mirror side.

Figure 5:
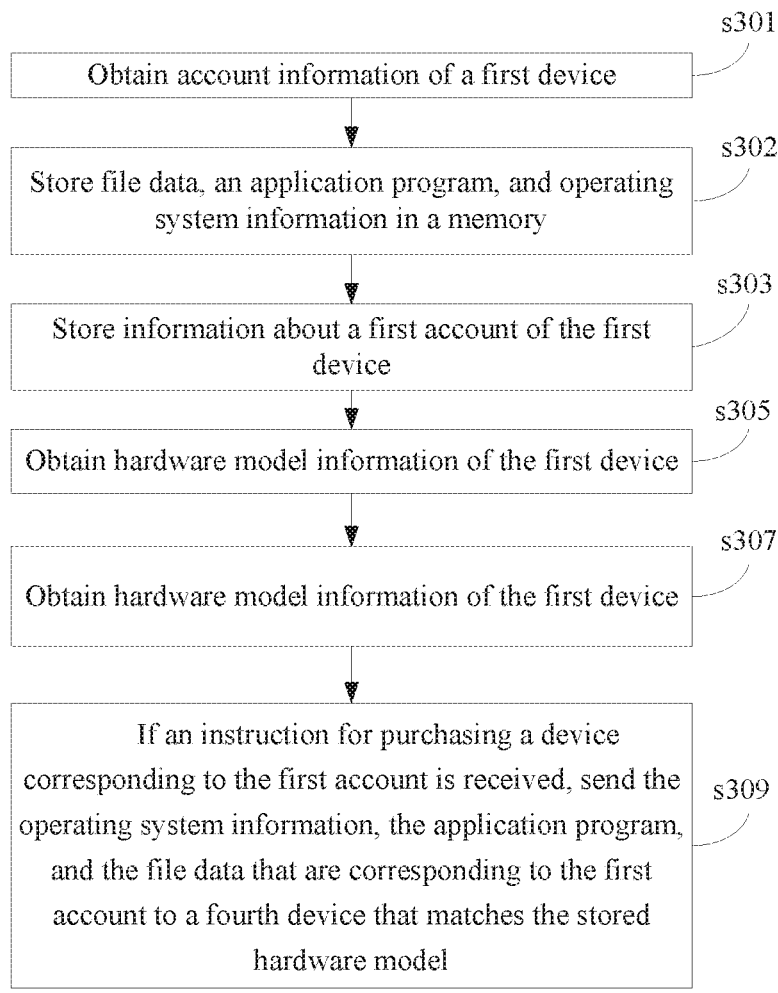
FIG. 5 is a flowchart of still another embodiment of an account-involved method for deep mirroring according to the present invention.

In an embodiment of the present invention, as shown in FIG. 5, FIG. 5 provides a flowchart of still another embodiment of the account-involved method for deep mirroring according to the present invention. The method further includes: S305, obtaining hardware model information of the first device; S307, storing the hardware model information of the first device, and binds the hardware model information of the first device to the first account: and S309, if an instruction for purchasing a device corresponding to the first account is received, sending the operating system information, the application program, and the file data that are corresponding to the first account to a fourth device that matches the stored hardware model. An effect achieved by this embodiment of the present invention is: when the first device is lost, data and programs are replicated from a mirror side to the fourth device that matches the hardware model of the first device. S305 may be performed before, after, or at the same time as S303. The step S307 of storing the hardware model information of the first device is after the step S303 of storing the information about the first account of the first device. An effect achieved by this embodiment of the present invention is: when the first device is lost, data and programs are replicated from a mirror side to the fourth device that matches the hardware model of the first device.

In this embodiment of the present invention, if an operation change occurs on the first device, an operation change instruction or operation change data of the first device is received; and the stored file data, application program, and operating system information are updated according to the operation change instruction or the operation change data of the first device by using a synchronization protocol.

In an embodiment of the present invention, the obtaining file data, an application program, and operating system information that are of a first device includes: receiving the file data, the application program, and the operating system information that are sent by the first device; or receiving network link or version name information that is sent by the first device and that is of the file data, the application program, and the operating system, and obtaining the file data, the application program, and the operating system information according to the network link or the version name information.

Figure 6:
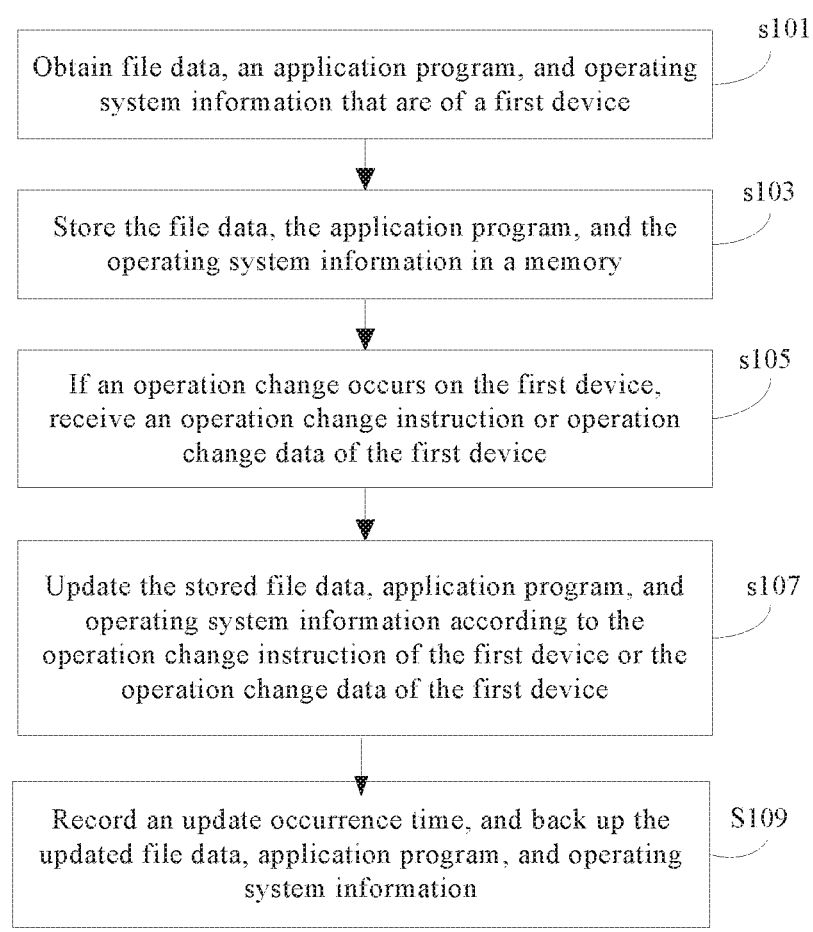
FIG. 6 is a flowchart of still another embodiment of a method for deep mirroring according to the present invention.

In an embodiment of the present invention, as shown in FIG. 6, FIG. 6 provides a flowchart of yet another embodiment of the method for deep mirroring of the present invention. After the step 107 of updating the stored file data, application program, and operating system information according to the operation change instruction or the operation change data of the first device, the method further includes: S109, recording an update occurrence time, and backing up the updated file data, application program, and operating system information. An effect achieved by this embodiment of the present invention is: the first device has only a current state while a mirror device can not only reflect the current state of the first device, but also manage all historical information of the first device. For example, data is backed up by stage. In this way, in a case of a misoperation such as an incorrect deletion operation on the first device, restoration from the mirror device can be implemented.

In an embodiment of the present invention, the method further includes: obtaining 3D outer shape and inner structure diagrams of the first device; storing the 3D outer shape and inner structure diagrams of the first device, and binding the 3D outer shape and inner structure diagrams of the first device to the first account; and if an instruction for presenting a device corresponding to the first account is received, presenting the 3D outer shape and inner structure diagrams of the first device. The obtaining 3D outer shape and inner structure diagrams of a first device is before, after or at the same time as the step S101 of obtaining file data, an application program, and operating system information that are of a first device; and the storing the 3D outer shape and inner structure diagrams of the first device, and binding the 3D outer shape and inner structure diagrams of the first device to the first account is after the step of obtaining account information of the first device.

An effect achieved by this embodiment of the present invention is: a mirror device simulates an outer shape and a structure that are of a physical device. For example, a user cannot learn an inner structure or inner elements of a mobile phone. An interior of the mirror device can be presented on the mirror device, so that the user can study each component of the mirror device. Also, these components are lifelike simulation with introduction to specific knowledge.

Figure 7:
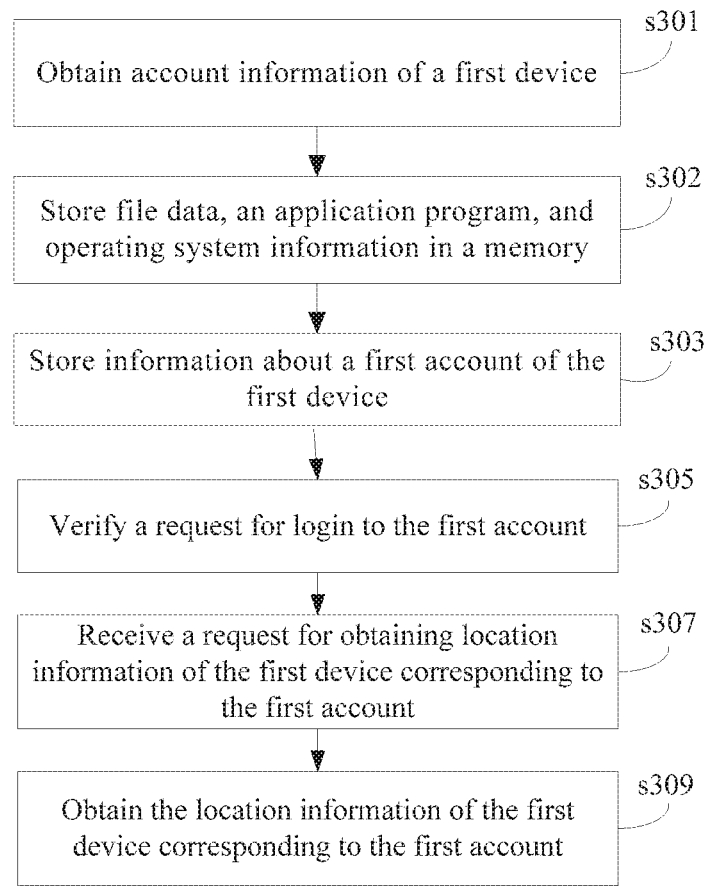
FIG. 7 is a flowchart of an embodiment of an account-involved method for deep mirroring according to the present invention.

In an embodiment of the present invention, as shown in FIG. 7, FIG. 7 provides a flowchart of an embodiment of an account-involved method for deep mirroring of the present invention. The method further includes: S305, verifying a request for login to the first account; S307, receiving a request for obtaining location information of the first device corresponding to the first account; and S309, obtaining the location information of the first device corresponding to the first account. The method is after the step of obtaining account information of the first device. An effect achieved by the method is: when the first device is lost, a find instruction for assisting in positioning, for example, a location information reporting instruction, is delivered from the mirror device to the first device, and the first device executes the instruction and reports the location information to the mirror device, so as to find the lost device.

Figure 8:
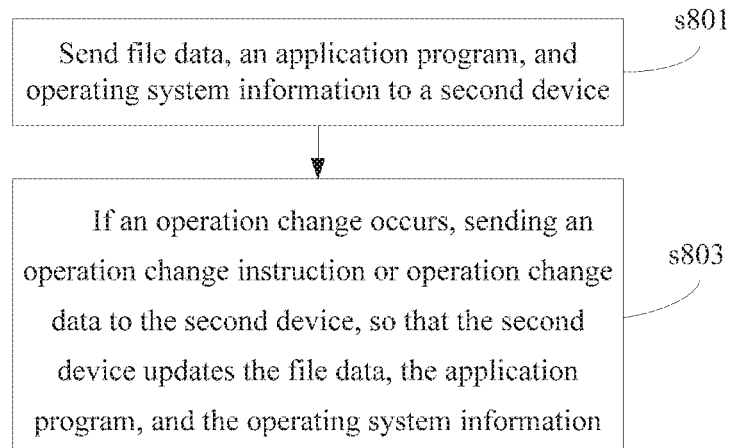
FIG. 8 is a flowchart of an embodiment of a method for deep mirroring on a terminal side according to the present invention.

An embodiment of the present invention provides a method for deep mirroring. As shown in FIG. 8, FIG. 8 provides a flowchart of an embodiment of the method for deep mirroring on a terminal side. The method includes: S801, sending file data, an application program, and operating system information to a second device; and S803, if an operation change occurs, sending an operation change instruction or operation change data to the second device, so that the second device updates the file data, the application program, and the operating system information. An execution body of this embodiment of the present invention corresponds to the first device in step S101. The second device corresponds to the execution body in S101. If a change occurs on the execution body of the method, an operation result is updated to the second device synchronously by using a synchronization protocol.

Figure 9A:
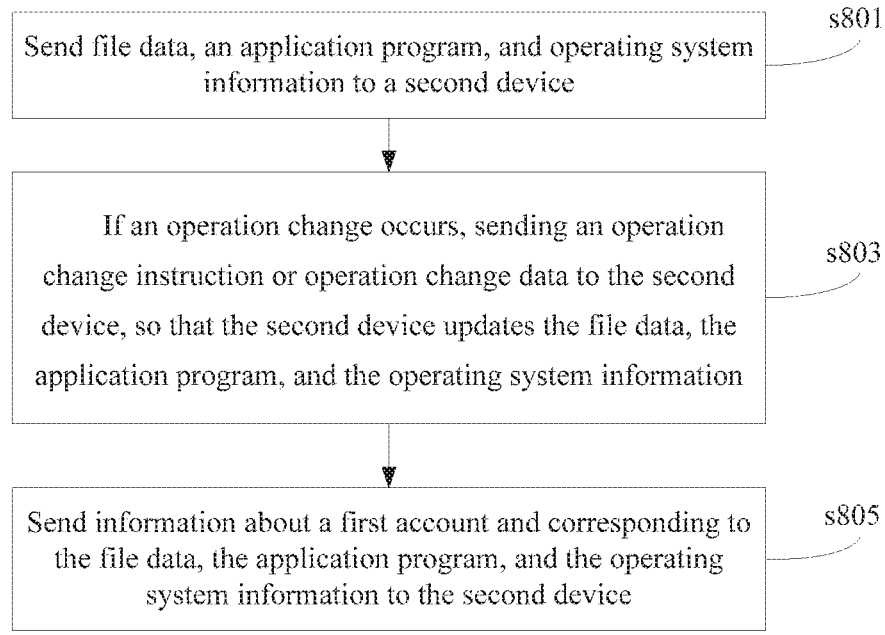
FIG. 9a and FIG. 9b are a flowchart of another embodiment of a method for deep mirroring on a terminal side according to the present invention.

In an embodiment of the present invention, a flowchart of another embodiment of the method for deep mirroring on a terminal side is provided. As shown in FIG. 9a, the method of the present invention further includes: S805, sending information about a first account and corresponding to the file data, the application program, and the operating system information to the second device, so that the second device stores the information about the first account and corresponding to the file data, the application program, and the operating system information. In FIG. 9a, step S805 may be after step S803. In another embodiment of the present invention, step S805 may be before or at the same time as step S803.

After the step S805 of sending information about a first account and corresponding to the file data, the application program, and the operating system information to the second device, so that the second device stores the information about the first account and corresponding to the file data, the application program, and the operating system information, if receiving an instruction for pre-configuring, on a third device, information corresponding to the information about the first account, the second device sends the operating system information, the application program, and the file data that are corresponding to the information about the first account to the third device.

Before, after, or at the same time as the step S805 of sending information about a first account and corresponding to the file data, the application program, and the operating system information to the second device, so that the second device stores the information about the first account and corresponding to the file data, the application program, and the operating system information, the method further includes: sending hardware model information corresponding to the first account to the second device. Therefore, after this step, if the second device receives an instruction for purchasing a device corresponding to the first account is received, the second device sends the operating system information, the application program, and the file data that are corresponding to the first account to a fourth device that matches the stored hardware model.

Figure 9B:
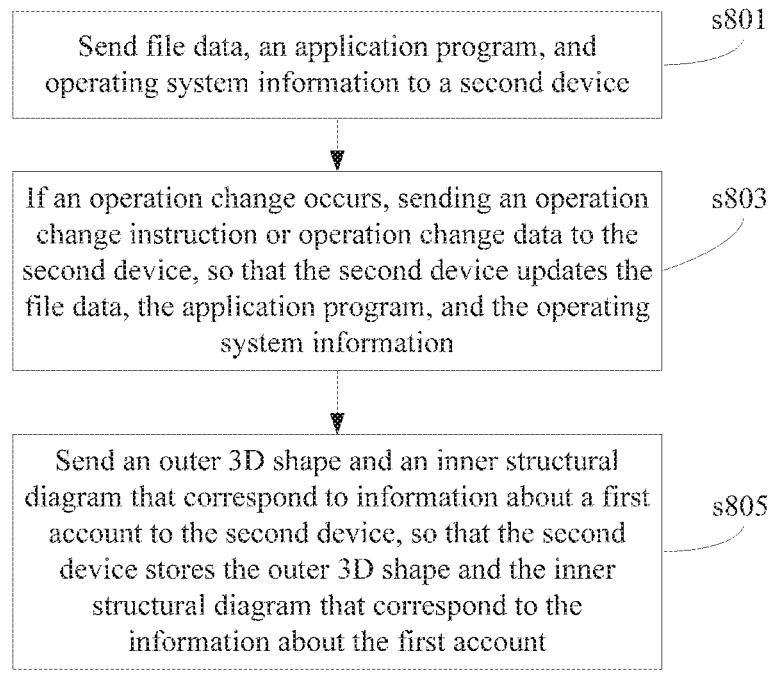

In an embodiment of the present invention, as shown in FIG. 9b, the method further includes: S805, sending 3D outer shape and inner structure diagrams corresponding to the information about the first account to the second device, so that the second device stores the 3D outer shape and inner structure diagrams corresponding to the information about the first account. In FIG. 9b, step S805 may be after step S803. In another embodiment of the present invention, step S805 may be before or at the same time as step S803. Therefore, a user can open a virtual interior of the first device on the second device to study each component.

In an embodiment of the present invention, the method further includes: receiving a request sent by the second device for obtaining location information of the first device corresponding to the first account, and sending the location information of the first device to the second device. An effect achieved by the method is: when the first device is lost, a find instruction for assisting in positioning, for example, a location information reporting instruction, is delivered from the second device to the first device, and the first device executes the instruction and reports the location information to the mirror device, so as to find the lost device.

Figure 10:
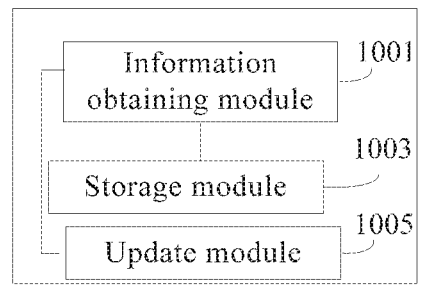
FIG. 10 is a structural diagram of an embodiment of an apparatus for deep mirroring according to the present invention.

An embodiment of the present invention provides an apparatus for deep mirroring. As shown in FIG. 10, FIG. 10 provides a structural diagram of the apparatus for deep mirroring. The apparatus includes: an information obtaining module 1001, a storage module 1003, and an update module 1005, where the information obtaining module 1001 is configured to obtain file data, an application program, and operating system information that are of a first device; the storage module 1003 is configured to store the file data, the application program, and the operating system information in a memory cell; and if an operation change occurs on the first device, the information obtaining module 1001 is further configured to receive an operation change instruction or operation change data of the first device; and the update module 1005 is configured to update the stored file data, application program, and operating system information according to the operation change instruction or the operation change data of the first device.

Figure 11:
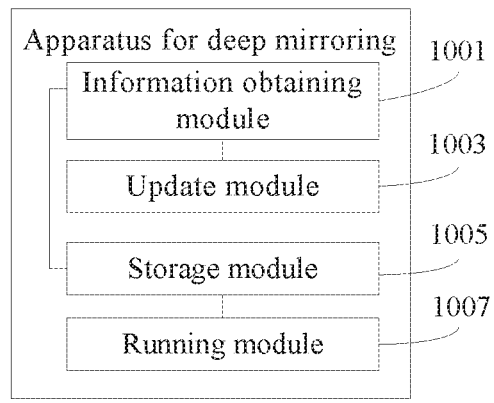
FIG. 11 is a structural diagram of another embodiment of an apparatus for deep mirroring according to the present invention.

In an apparatus embodiment of the present invention, as shown in FIG. 11, FIG. 11 provides a structural diagram of another embodiment of the apparatus for deep backup. The apparatus further includes a running module 1007. After the file data, the application program, and the operating system information are stored in the memory cell, the running module 1007 is configured to call, by using a processor, an instruction and code that are in the memory cell to run the operating system and the application program that are obtained from the first device.

Figure 12:
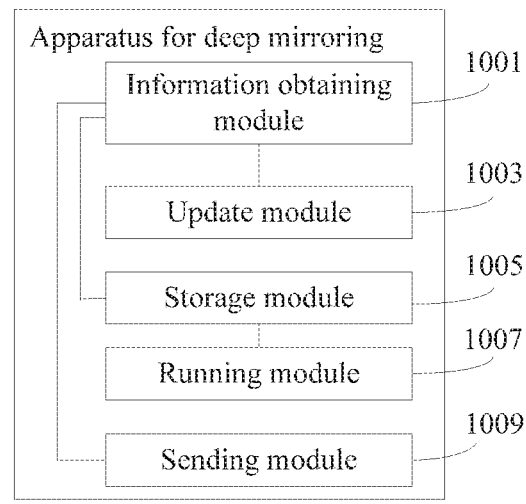
FIG. 12 is a structural diagram of still another embodiment of an apparatus for deep mirroring according to the present invention.

In an apparatus embodiment of the present invention, as shown in FIG. 12, FIG. 12 provides a structural diagram of still another embodiment of the apparatus for deep backup. Before the storage module 1003 stores the file data, the application program, and the operating system information in the memory cell, the information obtaining module 1001 is further configured to obtain account information of the first device; the storage module 1003 is further configured to store information about a first account of the first device; and the apparatus further includes a sending module 1009. If the information obtaining module 1001 receives an instruction for pre-configuring, on a third device, information corresponding to the information about the first account, the sending module 1009 is configured to send operating system information, an application program, and file data that are corresponding to the information about the first account to the third device.

In an apparatus embodiment of the present invention, the information obtaining module 1001 is specifically configured to receive the file data, the application program, and the operating system information that are sent by the first device; or the information obtaining module 1001 is specifically configured to receive network link or version name information that is sent by the first device and that is of the file data, the application program, and the operating system, and obtain the file data, the application program, and the operating system information according to the network link or the version name information.

In an apparatus embodiment of the present invention, the information obtaining module 1001 is further configured to obtain hardware model information of the first device; the storage module 1003 is further configured to store the hardware model information of the first device. The apparatus further includes a sending module 1009, and if an instruction for purchasing a device corresponding to the first account is received, the sending module 1009 is further configured to send the operating system information, the application program, and the file data that are corresponding to the first account to a fourth device that matches the stored hardware model.

In an apparatus embodiment of the present invention, the information obtaining module 1001 is further configured to obtain 3D outer shape and inner structure diagrams of the first device; the storage module 1003 stores the 3D outer shape and inner structure diagrams of the first device, and binds the 3D outer shape and inner structure diagrams of the first device to the first account; and if an instruction for presenting a device corresponding to the first account is received, the running module is further configured to present the 3D outer shape and inner structure diagrams of the first device.

In an apparatus embodiment of the present invention, after the update module 1005 updates the stored file data, application program, and operating system information according to the operation change instruction or the operation change data of the first device, the storage module 1003 is further configured to record an update occurrence time, and back up the updated file data, application program, and operating system information.

In an apparatus embodiment of the present invention, the information obtaining module 1001 is further configured to: if a request for login to the first account is verified and a request for obtaining location information of the first device corresponding to the first account is received, obtain the location information of the first device corresponding to the first account.

In an apparatus embodiment of the present invention, the apparatus is a cloud server or a terminal device.

Figure 13:
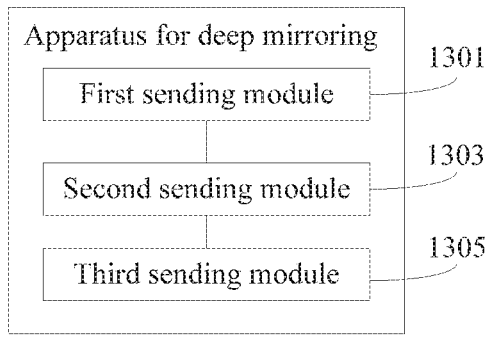
FIG. 13 is a structural diagram of an embodiment of an apparatus for deep mirroring on a terminal side according to the present invention.

An embodiment of the present invention provides an apparatus for deep mirroring. As shown in FIG. 13, FIG. 13 provides a structural diagram of an embodiment of the apparatus for deep mirroring on a terminal side according to the present invention. The apparatus includes: a first sending module 1301 and a second sending module 1303. The first sending module 1301 is configured to send file data, an application program, and operating system information to a second device. If an operation change occurs, the second sending module 1303 sends an operation change instruction or operation change data to the second device, so that the second device updates the file data, the application program, and the operating system information.

In an apparatus embodiment of the present invention, the first sending module 1301 is further configured to send information about a first account and corresponding to the file data, the application program, and the operating system information to the second device, so that the second device stores the information about the first account and corresponding to the file data, the application program, and the operating system information.

In an apparatus embodiment of the present invention, the first sending module 1301 is further configured to send 3D outer shape and inner structure diagrams corresponding to the information about the first account to the second device, so that the second device stores the 3D outer shape and inner structure diagrams corresponding to the information about the first account.

In an apparatus embodiment of the present invention, as shown in FIG. 13, the apparatus further includes a third sending module 1305. If a request for obtaining location information of the first device corresponding to the first account is received, the third sending module 1305 is configured to send the location information of the first device to the second device.

In an apparatus embodiment of the present invention, the apparatus is a terminal device.

Figure 14:
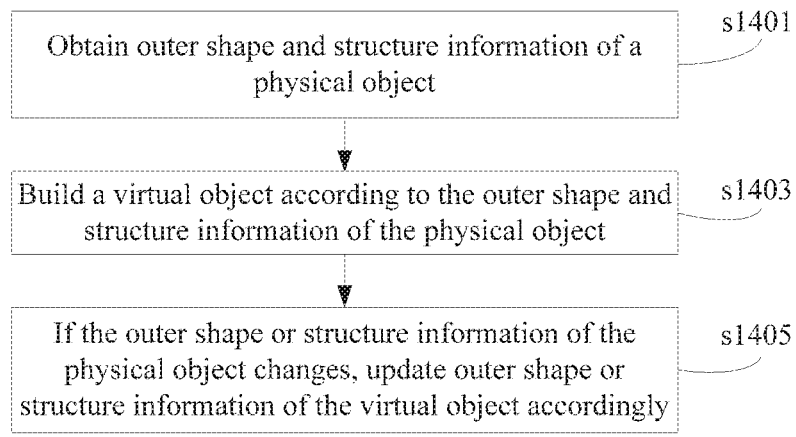
FIG. 14 is a flowchart of an embodiment of a virtual object of deep mirroring according to the present invention.

An embodiment of the present invention provides a method for deep mirroring. As shown in FIG. 14, FIG. 14 is a flowchart of an embodiment of a virtual object of deep mirroring according to the present invention. The method includes: S1401, obtaining outer shape and structure information of a physical object; S1403, building a virtual object according to the outer shape and structure information of the physical object; and S1405, if the outer shape or structure information of the physical object changes, adjusting outer shape or structure information of the virtual object accordingly. In an embodiment of the present invention, the physical object is an electronic device such as a mobile phone, a computer, a tablet computer, a wearable smart terminal, a television set, or a camera. Alternatively, the physical object is a non-electronic device such as a watch, a car, or a house.

In this embodiment of the present invention, if the physical object is a house, structure information of the house includes an inner structure and layout information of hidden water, power, gas and other pipelines. Mirroring the structure information of the house helps maintenance and management of the house.

In this embodiment of the present invention, if the physical object is a watch, structure information of the watch includes an inner structure of the watch. Mirroring the structure information of the watch helps a user learn the inner structure of the watch well.

In this embodiment of the present invention, if the physical object is a car, structure information of the car includes an inner structure. Mirroring the structure information of the car helps repair, replace parts of, and manage driving records information of the car.

Figure 15:
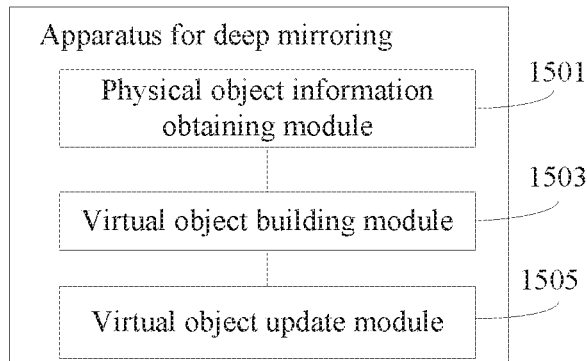
FIG. 15 is a structural diagram of an embodiment of a virtual object of deep mirroring according to the present invention.

An embodiment of the present invention provides an apparatus for deep mirroring. As shown in FIG. 15, FIG. 15 is a structural diagram of an embodiment of a virtual object of deep mirroring according to the present invention. The apparatus includes a physical object information obtaining module 1501, a virtual object building module 1503, and a virtual object update module 1505. The physical object information obtaining module 1501 is configured to obtain outer shape and structure information of a physical object; the virtual object building module 1503 is configured to build a virtual object according to the outer shape and structure information of the physical object; and if the outer shape or structure information of the physical object changes, the virtual object update module 1505 is configured to update outer shape or structure information of the virtual object accordingly.

An embodiment of the present invention provides a system for deep mirroring. The system includes a first device and a second device. The second device is configured to obtain file data, an application program, and operating system information that are of the first device; store the file data, the application program, and the operating system information in a memory cell; and if an operation change occurs on the first device, receive an operation change instruction or operation change data of the first device, and update the stored file data, application program, and operating system information according to the operation change instruction or the operation change data of the first device. The first device is configured to send file data, an application program, and operating system information to the second device; and if an operation change occurs, send an operation change instruction or operation change data to the second device, so that the second device updates the file data, the application program, and the operating system information.

Figure 16:
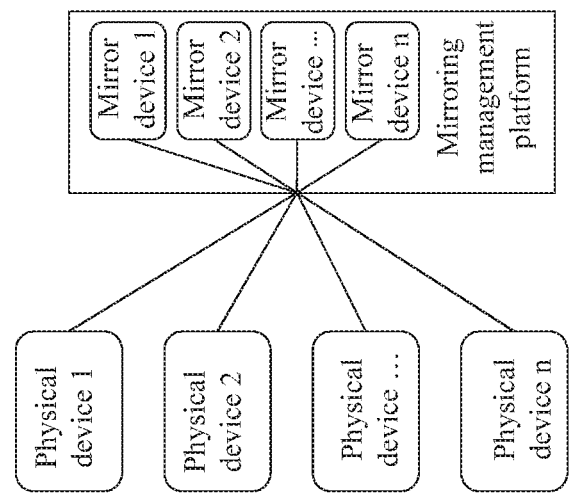
FIG. 16 is a structural diagram of an embodiment of a system for deep mirroring according to the present invention.

In an embodiment of the present invention, as shown in FIG. 16, the second device corresponds to a mirror device in a mirroring management platform, and the first device corresponds to a physical device. The mirroring management platform includes multiple mirror devices corresponding to physical devices respectively.

Figure 17:
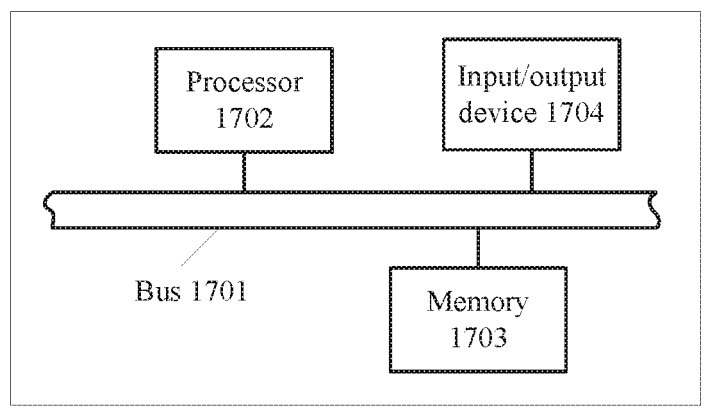
FIG. 17 is a structural diagram of an embodiment of a computer system for deep mirroring according to the present invention.

An embodiment of the present invention provides a computer system for deep backup, as shown in FIG. 17. The computer system includes a bus 1701, a processor 1702, a memory 1703, and an input/output device 1704. The processor, the memory, and the input/output device are connected by using the bus. The memory is configured to store data and code. The processor is coupled to the memory and calls the data and the code in the memory to implement the following method: obtaining file data, an application program, and operating system information that are of a first device; storing the file data, the application program, and the operating system information in a memory cell; if an operation change occurs on the first device, receiving an operation change instruction or operation change data of the first device; and updating the stored file data, application program, and operating system information according to the operation change instruction or the operation change data of the first device.

In another embodiment of the present invention, the processor is coupled to the memory and calls the data and the code in the memory to implement the following method: sending file data, an application program, and operating system information to a second device; and if an operation change occurs, sending an operation change instruction or operation change data to the second device, so that the second device updates the file data, the application program, and the operating system information.

In one embodiment of the present invention, the input/output device includes a text input device such as a keyboard, a touchscreen, or a mouse, a camera, a haptic module, or the like. A person skilled in the art may understand that an accompanying drawing is merely a schematic diagram of a embodiment, and modules or processes in the accompanying drawing are not necessarily required for implementing the present invention. A person skilled in the art may understand that modules in an apparatus provided in the embodiments may be arranged in the apparatus according to the description of the embodiments, or may be configured in one or more apparatuses that are different from that described in the embodiments. The modules in the foregoing embodiments may be combined into one module, or split into a plurality of submodules.

A person of ordinary skill in the art may understand that all or a part of the steps of the methods in the embodiments may be implemented by a program instructing relevant hardware. The program may be stored in a computer readable storage medium, including a ROM, a RAM, a magnetic disk, or an optical disc.

What is claimed is:

1. A method for deep mirroring, wherein the method comprises:
obtaining each of file data of a first device, an application program of the first device, and operating system of the first device;
obtaining account information of the first device;
storing each of the file data, the application program, and the operating system information in first information in a memory, wherein the first information is about a first account of the first device, and wherein the first information corresponds to the file data, the application program, and the operating system information;
obtaining a three-dimensional (3D) outer shape diagram of the first device and inner structure diagram of the first device;
storing the 3D outer shape diagram and the inner structure diagram in the memory;
binding the 3D outer shape diagram and the inner structure diagram to the first information about the first account;
presenting the 3D outer shape diagram and the inner structure diagram when a first instruction for presenting a device that corresponds to the first information about the first account is received;

receiving either an operation change instruction of the first device or operation change data of the first device when an operation change occurs on the first device; and updating each of the file data, the application program, and the operating system information according to the operation change instruction or the operation change data.

2. The method of claim 1, further comprising sending each of the operating system information, the application program, and the file data to a third device when an instruction for pre-configuring second information on the third device is received, wherein the second information corresponds to the first information about the first account.

3. The method of 1, further comprising:
obtaining hardware model information of the first device;
storing the hardware model information of the first device;
binding the hardware model information of the first device to the first account; and
sending each of the operating system information, the application program, and the file data to a fourth device when a second instruction for purchasing a device that corresponds to the first account is received, wherein the fourth device matches the hardware model information of the first device.

4. The method of claim 1, wherein after storing each of the file data, the application program, and the operating system information in the memory, the method further comprises:
calling an instruction and code from the memory,
obtaining an operating system and the application program from the first device; and
running the operating system and the application program after obtaining the operating system and the application program from the first device.

5. The method of claim 1, further comprising:
receiving network link or version name information from the first device, wherein the network link or the version name information corresponds to each of the file data, the application program, and the operating system; and
obtaining each of the file data, the application program, and the operating system information according to the network link or the version name information.

6. A method for deep mirroring, comprising:
sending each of file data, an application program, and operating system information to a second device, wherein each of the file data, the application program, and the operating system information corresponds to first information about a first account;
sending a three dimensional (3D) outer shape diagram and an inner structure diagram to the second device to enable the second device to store the 3D outer shape diagram and the inner structure diagram, wherein the 3D outer shape diagram and the inner structure diagram correspond to the first information about the first account; and
sending an operation change instruction or operation change data to the second device to enable the second device to update each of the file data, the application program, and the operating system information.

7. The method of claim 6, further comprising sending the first information to the second device to enable the second device to store the first information.

8. The method of claim 6, further comprising:
receiving a request to obtain location information of a first device, wherein the location information corresponds to the first account; and
sending the location information to the second device.

9. An apparatus for deep mirroring, comprising
a memory configured to:
store each of file data of a first device, application program of the first device, and operating system information of the first device in first information, wherein the first information is about a first account of the first device, and wherein the first information corresponds to the file data, the application program, and the operating system information; and
store a three-dimensional (3D) outer shape diagram and a inner structure diagram; and
a processor coupled to the memory and configured to execute instructions to:
obtain account information of the first device;
obtain each of file data, the application program, and the operating system information;
obtain the 3D outer shape diagram and the inner structure diagram;
bind the 3D outer shape diagram and the inner structure diagram to the first information about the first account;
present the 3D outer shape diagram and the inner structure diagram when a first instruction for presenting a device that corresponds to the first information about the first account is received;
receive an operation change instruction or operation change data of the first device when an operation change occurs on the first device; and
update each of the file data, the application program, and the operating system information according to either the operation change instruction or the operation change data of the first device.

10. The apparatus of claim 9, wherein the instructions further cause the processor to be configured to:
receive network link or version name information from the first device of, wherein the network link or the version name information corresponds to the file data, the application program, and the operating system; and
obtain the file data, the application program, and the operating system information according to the network link or the version name information.

11. The apparatus of claim 9, wherein the instructions further cause the processor to be configured to obtain hardware model information of the first device, wherein the memory is further configured to store the hardware model information of the first device, wherein the processor is further configured to send each of the operating system information, the application program, and the file data to a fourth device when a second instruction for purchasing a device that corresponds to the first account is received, and wherein the fourth device matches the hardware model information of the first device.

12. The apparatus of claim 9, wherein the instructions further cause the processor to be configured to:
call an instruction and code from the memory; and
obtain the operating system and the application program from the first device; and
run the operating system and the application program after obtaining the operating system and the application program from the first device.

13. The apparatus of claim 9, wherein the instructions further cause the processor to be configured to receive each of the file data, the application program, and the operating system information from the first device.

14. An apparatus for deep mirroring, wherein the apparatus comprises:
   a memory comprising instructions; and
   a processor coupled to the memory and configured to execute the instructions, wherein the instructions cause the processor to be configured to:
      send each of file data, an application program, and operating system information to a second device, wherein each of the file data, the application program, and the operating system information corresponds to first information about a first account;
      send a three dimensional (3D) outer shape diagram and an inner structure diagram to the second device such that the second device stores the 3D outer shape diagram and the inner structure diagram, wherein the 3D outer shape diagram and the inner structure diagram correspond to the first information about the first account; and
      send an operation change instruction or operation change data to the second device to enable the second device to update each of the file data, the application program, and the operating system information.

15. The apparatus of claim 14, wherein the instructions further cause the processor to be configured to send the first information to the second device to enable the second device to store the first information.

* * * * *